United States Patent [19]

Makishima et al.

[11] Patent Number: 4,839,182

[45] Date of Patent: Jun. 13, 1989

[54] PROCESS FOR THE PRODUCTION OF FRIED POTATO STRIPS

[75] Inventors: Shinichi Makishima; Keizo Mochizuki, both of Kawasaki, Japan

[73] Assignee: Meiji Seika Kaisha, Ltd., Tokyo, Japan

[21] Appl. No.: 156,680

[22] Filed: Feb. 17, 1988

[30] Foreign Application Priority Data

Nov. 24, 1987 [JP]  Japan ................................. 62-293938

[51] Int. Cl.$^4$ ............................................. A23L 1/217
[52] U.S. Cl. ................................... 426/242; 426/243; 426/441
[58] Field of Search ............... 426/241, 438, 441, 637, 426/242, 243

[56] References Cited

U.S. PATENT DOCUMENTS

| | | | |
|---|---|---|---|
| 3,365,301 | 1/1968 | Lipoma et al. | 426/242 |
| 3,649,305 | 3/1972 | Wilder | 426/637 X |
| 3,679,432 | 7/1972 | Schiffmann et al. | 426/243 |
| 3,881,028 | 4/1975 | Capossela et al. | 426/438 X |
| 4,109,020 | 8/1978 | Gorfien et al. | 426/241 |
| 4,219,575 | 8/1980 | Saunders et al. | 426/438 X |
| 4,542,030 | 9/1985 | Havry et al. | 426/438 X |
| 4,632,838 | 12/1986 | Doenges | 426/438 X |

FOREIGN PATENT DOCUMENTS

| | | |
|---|---|---|
| 55-29917 | 3/1980 | Japan . |
| 1034035 | 6/1966 | United Kingdom . |
| 1344125 | 1/1974 | United Kingdom . |

*Primary Examiner*—Arthur L. Corbin
*Attorney, Agent, or Firm*—Armstrong, Nikaido, Marmelstein Kubovcik & Murray

[57] ABSTRACT

Disclosed is a process for the production of french-fried potato strips, which have a crisp mouth feel and neither shrinkage nor deformation. The process comprises the steps of cutting raw potatoes to form strips thereof, blanching the strips, par-frying the blanched strips in an edible oil, freezing the fried strips immediately after the par-frying, and then subjecting the frozen strips to finish frying in an edible oil, while subjecting to microwave energy.

3 Claims, 1 Drawing Sheet

FIG. 1A
FIG. 1B
FIG. 1C
PRIOR ART
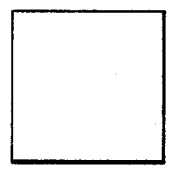
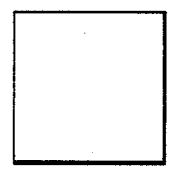
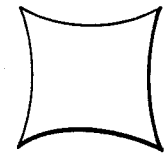
FIG. 2
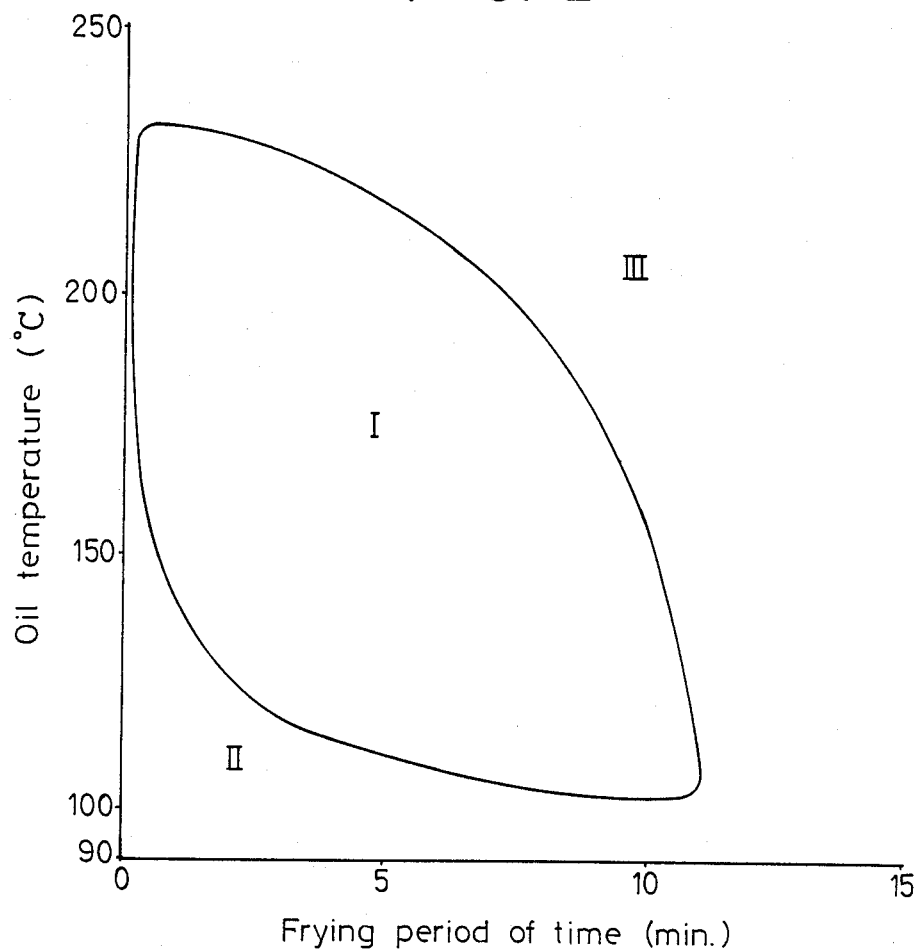

PROCESS FOR THE PRODUCTION OF FRIED POTATO STRIPS

BACKGROUND OF THE INVENTION

1. Field of the Invention

The present invention relates to a process for the production of strips of fried potato, and more particularly to that comprising the steps of cutting raw peeled potatoes into rectangular strips of the same size, blanching the strips, par-frying and immediately freezing the par-fried strips, and then finish frying frozen strips in an edible oil, while subjecting them to microwave energy.

2. Related Arts

As well known products, wherein raw potatoes are washed, peeled, cut into a predetermined shape and deep fat fried in an edible oil, there are so-called potato chips, french-fried potatoes and the like.

Among them, the potato chips have been manufactured by frying the cut potato pieces in the edible oil at a temperature of from 130° to 180° C. and are characterized in having a crisp mouth feel and a low moisture content of from 0.1 to 5% by weight, which allows marketing of the product without a need for refrigeration. On the other hand, the french-fried potatoes have been manufactured by cutting the raw potatoes into rectangular strips, for instance, strips with 10×10 millimeters in cross-section, washing in cold water, blanching and then frying the strips in edible oil at a temperature of about 180° C.

U.S. Pat. No. 4,109,020, British Pat. Nos. 1034035 and 1344125 as well as Japanese Pat. No. 55-29917 (A) teach utilization of microwave to heat pieces of potatoes, after having fried the same.

It has been considered that the french-fried potatoes, to which the present invention, pertains are difficult for marketing, since the outer layer thererof is in a dried state to give a crisp mouth feel but the core portion thereof still has a higher moisture content, which allows them to gradually lose a crisp mouth feel, whereby their flavor and taste are remarkably reduced, as they get cold.

In the market, there has been sold a frozen product of french-fried potatoes, which has been prepared by cutting raw potatoes into rectangular strips with cross-section of 10×10 millimeters, frying the strips, and then freezing the same. If the frozen strips are fried in an edible oil for a long period of time to dehydrate them to such an extent that they are able to be marketed without a need for refrigeration, however, wrinkles generate in the outer layer thereof to provide fried strips in a curved state, which are not welcomed by consumers. Further, an extension of frying time does not provide an adequate dehydration, if fried in an oil at too low temperature, for instance at about 100° C., and if fried in an oil at a relatively high temperature, for instance at about 140° C., a scorching will occur on the outer layer of the strips before completing dehydration from the core portion thereof, so that the resulting fried potato strips become one without market value.

According to experiments made by the inventors, it has been found that relatively thin potato strips formed by cutting whole potatoes, preferably peeled into rectangular strips with 2×2 millimeters cross-section, may be made into fried potato strips having a desired crisp mouth feel and a low moisture content to allow their marketing without a need for refrigeration, under the frying conditions similar to those for said potato chips, and that it is impossible under such frying conditions for potato chips to prepare french-fried potatoes having a rectangular shape with a cross-section of 3×3 millimeters or more, the desired mouth feel and a relatively low moisture content. It is the purpose of the present invention to produce such a product.

Each of said patents [U.S. Pat. No. 4,109,020, British Pat. Nos. 1034035 and 1344125 as well as Japanese Pat. No. 55-29917 (A)] suggests that potato strips can be dehydrated deep to its core portion, by frying raw potato strips in an edible oil and then subjecting the resulting fried potato strips to microwave energy. The inventors, therefore, have made an experiment, in accordance with such a method as taught therein. Namely, relatively thick strips of raw potato were fried at 180° C. for 5 minutes until an outer layer thereof is turned to a light brown color, although the core portion has a relatively high moisture content, and then the resulting fried strips were transferred into a microwave oven for treating the strips to obtain strips dehydrated deep to its core portion, by subjecting to microwave energy for 5 minutes. However, the resulting potato strips shrinked and deformed in cross-section thereof, as shown in FIG. 1C, each strip was remarkably colored in dark brown at an intermediate portion thereof, in comparison with that in opposite ends and became curved or twisted. These matters will not permit the product to be sold in market.

BRIEF DESCRIPTION OF THE DRAWINGS

FIG. 1A is a cross-section of a raw potato strip;

FIG. 1B is a cross-section of a fried potato strip, as a good product;

FIG. 1C is a cross-section of a fried potato strip, as an inferior product; and

FIG. 2 is a diagram showing a relation between an oil temperature and a period of time in a par-frying according to the invention, in which a suitable domain (I) and unsuitable domain (II and III) are shown.

SUMMARY OF THE INVENTION

It is an object of the invention to provide a process for the production of french-fried potato strips which have neither shrinkage nor deformation in external appearance and are sufficiently dehydrated not only in outer layer but also in core portion thereof to give a crisp mouth feel.

Another object of the invention is to provide a process for the production of french-fried potato strips having a lower moisture content to allow marketing the same without a need for refrigeration.

According to the invention, the problems encountered in the conventional processes can be dissolved and the objects referred to can be attained by a process for the production of french-fried potato strips, which comprise the steps of cutting whole potatoes, preferably peeled into strips, blanching the strips, subjecting the blanched strips to a par-frying in an edible oil at a temperature of from 105° to 230° C. for 11 to 0.25 minutes, freezing immediately the resulting par-fried strips, and subjecting the frozen strips to a finish frying in an edible oil at a temperature of from 100° to 230° C. for 15 to 2 minutes, while subjecting to microwave energy, to dehydrate the strips being fried, so as to make their moisture content to from 10 to 0.1% by weight.

In case the fried strip product has a moisture content of more than 5.0% by weight, a supplementary drying step may be added to reduce its moisture content to from 5.0 to 0.1% by weight, so that the product can be marketed without a need for refrigeration. For the drying step, an air drying, vacuum drying, microwave drying or any combination thereof may be employed.

The process according to the invention wil now be further explained in more detail. The process may be divided into a first stage for preparing the par-fried frozen potato strips and a second stage for treating the frozen strips to make the same into the final product. The frozen strips can be stored in a refrigerator for a long period of time, without causing any noticeable deterioration in quality, so that the first stage has a significance of an insurance of the raw material for the second stage.

In the first step, the raw potatoes are cut into strips having a suitable cross-section of triangle, square, rectangle, pentagon, pentagram or the like, each having a side-length of about 3 to 30 milimeters. In the second and third steps, the resulting strips are blanched in a conventional manner and then subjected to par-frying. The conditions for the par-frying give a remarkable influence on mouth feel inclusive of crispness, external appearance and oil content of the final product and thus specified for the present invention as for from 11 to 0.25 minutes in the edible oil at the temperature of from 105° to 230° C. The specified frying condition suitable for the invention is shown as a domain I in FIG. 2.

If the temperature and time for the par-frying of the blanched strips having a cross-section as shown in FIG. 1A are selected within the domain I, desired fried strips having a cross-section as shown in FIG. 1B and a moisture content of from 50 to 75% by weight can be obtained. While, if conditions within another domain (II) in FIG. 2 are selected, the strips are fried at a relatively low temperature for a shortened period of time to cause a shrinkage or deformation thereof, as having a cross-section as shown in FIG. 1C, its oil content becomes too high, so that even if such fried strips shall be further treated in the second stage, the resulting final product is not so attractive for consumers in its external appearance and mouth feel. If other conditions within a still other domain (III) in FIG. 2 are selected, the strips will be fried at an increased temperature for an extended period of time to cause a remarkable discoloration into a dark brown or a scorch, which makes the final product undelicious or reduces its market value.

In the fourth step, namely the last step for the first stage, the par-fried strips are frozen immediately after the par-frying, because, otherwise, the par-fried strips will deform as shown in FIG. 1C, due to its natural dehydration, when those are left to stand, for awhile. As condition for the freezing, it is sufficient to such an extent that the outer layer of the par-fried strips is frozen, although there is no problem, even if the strips can be reversed, for instance, in a refrigerator for a long period of time, to be used as an intermediate raw material.

As a matter of course, commerically available frozen par-fried frozen strips are fried in the edible oil at a temperature of from 100° to 230° C. for from 15 to 2 minutes. If the frying temperature is lower than 100° C., the required frying period of time becomes too long to make the oil content of the final product an undesired high level. If the frying temperature is higher than 230° C., there is the possibility of causing a scorch on the final product.

According to the invention, the microwave heating is carried out during the frying period of time. It is preferable to initiate the heating about 10 seconds after putting of the frozen strips into the heated edible oil, since such a delayed microwave heating is better for the strips which have been defrozen through a beginning period for frying and come up to cause a floatation thereof in surface level of the edible oil, although the microwave heating can be initiated before or just after the putting of the frozen strips into the heated edible oil. In view of an efficiency of microwave heating, it is preferable to initiate the same after 10 or more seconds from putting of the frozen strips in the heated edible oil, when the frying temperature is 180° C. or more; after 20 seconds or more, when the temperature is about 150° C.; and after 30 seconds or more, when the temperature is about 120° C.

If the frozen strips are defrozen prior to frying, with use of a certain method, the microwave heating may be initiated, immediately after the putting of the defrozen strips into the heated edible oil. A required period of time for the heating depends on the amount of the strips to be treated and the power of a microwave generator to be employed. However, in general, about 1 to 4 minutes will be required, when 100g of the strips are treated with use of a 500 watts microwave generator; about 2 to 8 minutes for 200 g of the strips with use of the 500 watts microwave generator; and about 3 to 7 minutes for 1Kg of the strips with use of the 5 kilowatts microwave generator. Each of the exemplified heating period of time varies in a relatively wide range, since it also depends on the frying temperature. The microwave heating may be carried out continuously or intermittently under the conditions as stated above.

A moisture content of the finish fried product depends on the temperature and period of time for the frying operation as well as the conditions for microwave heating. If such factors are selected within the ranges as stated above, a desired product can be obtained, which has a moisture content not exceeding 10% by weight and shows a crisp mouth feel. However, it is preferable to reduce the moisture content of the final product into a range of from 5.0 to 0.1% by weight, since such a low moisture product can be marketed without a need for refrigeration and keeps its desirable mouth feel for an extended period of time.

Therefore, if the final product has a moisture content of higher than 5% by weight, it may be further treated to reduce its moisture content within such range of from 5.0 to 0.1% by weight, by means of air drying, vacuum drying, microwave drying, a combination thereof or any other appropriate measure.

The finish frying operation accompanied with microwave heating permits the production of desired frenchfried potato strips giving pleasant mouth feel including crispness and having a good external appearance, since those are free from shrinkage or deformation, as shown in FIG. 1B. Further, the combination of finish frying with microwave heating has also an advantage of reduction in required operation time.

As far as the operation time for the second stage is concerned, the conventional process takes 5 minutes for frying the frozen strips in edible oil and further 5 minutes for the dehydration of the fried strips by heating in microwave oven and thus requires 10 minutes in total, but according to the process of the invention, it takes only 5 minutes, due to simultaneous treatment with the finish frying and microwave heating (In this connection, please note that the product according to the conventional process is a curved or twisted one and thus not excellent in at least its external appearance, as stated in the item of--Related Arts--).

DESCRIPTION OF THE PREFERRED EMBODIMENTS

The invention will now be further explained with reference to Examples for the production of french-fried potato strips.

EXAMPLE 1

1 Kg of commercially available raw potatoes were cut into strips, each having a rectangular cross-section of 7×10 millimeters, blanched in water at 80° C. for 5 minutes, and fried in 20 liters of an edible oil at 150° C. for 5 minutes. The resulting par-fried strips were immediately put into a refrigerator at −20° C. to preserve the same therein for overnight freezing thereof.

The frozen par-fried strips were taken from the refrigerator and put into 10 liters of an edible oil at 180° C. for 5 minutes and after 1 minute from the initiation of the frying operation, microwave (5 kilowatts) heating was carried out for 4 minutes to expose the strips being fried. The resulting fried strips were raised-up from the edible oil and left to stand, for a while, to drain off therefrom an excess oil, in a conventional manner.

The resulting fried strips turned to a light brown, had a moisture content of 1.5% by weight and showed a crisp mouth feel. Neither shrinkage nor deformation was observed on the products.

EXAMPLE 2

100 g of commerically available frozen strips for french-fried potatoes (par-fried products, each having size of about 10×10×50 millimeters with wave-like undulations in each side surface) were fried in 1 liter of an edible oil at 150° C. for 6 minutes. After 1 minute from the initiation of the frying operation, microwave (1 kilowatt) heating was carried out for 1 minute to expose the strips being fried; after 3 minutes from the initiation of frying operation, microwave (1 kilowatt) heating was carried out for 1 minute; and further, after 5 minutes from the initiation of frying operation, microwave (1 kilowatt) heating was carried out for 1 minute, to obtain fried strips.

The resulting fried strips turned to a light brown, had a moisture content of 5.0% by weight and showed a crisp mouth feel. Neither shrinkage nor deformation was observed on the products.

EXAMPLE 3

Frozen par-fried potato strips were prepared in a manner similar to that stated in Example 1. 500 g of the frozen strips were put into 10 liters of an edible oil at 150° C. for 4 minutes. After 1.5 minutes from the initiation of the frying operation, microwave (3 kilowatts) heating was carried out for 2 minutes to expose the strips being fried.

The resulting fried strips showed a light brown color but had a moisture content of 6.0% by weight. Therefore, the fried strips were vacuum dried at 90° C. for 20 minutes to obtain a final product having a moisture content of 1.0% by weight and having a crisp mouth feel. The product also showed neither shrinkage nor deformation.

What is claimed is:

1. A process for the production of strips of french-fried potatoes, which the comprises steps of cutting a potato into strips of raw potato, blanching the strips, subjecting the blanched strips to par-frying in an edible oil at a temperature of from 105° to 230° C. for 11 to 0.25 minutes, freezing immediately the resulting par-fried strips, and subjecting the frozen strips to a finish frying in an edible oil at a temperature of from 100° to 230° C. for 15 to 2 minutes, while simultaneously subjecting the strips being fried to microwave energy, to dehydrate them so as to bring their moisture content to a range of 10 to 0.1% by weight.

2. A process as claimed in claim 1, wherein said strips of raw potato have a rectangular cross-section with each side having a length of 3 to 30 millimeters.

3. A process as claimed in claim 1 or 2, further comprising a step of drying the fried strips until the moisture content thereof is reduced to a range of 5.0 to 0.1% by weight, if said fried strips have a moisture content of more than 5.0% by weight after the finish frying step.

* * * * *